(12) United States Patent
Kanai et al.

(10) Patent No.: US 7,672,481 B2
(45) Date of Patent: Mar. 2, 2010

(54) IMAGE INFORMATION PROCESSING SYSTEM, IMAGE INFORMATION PROCESSING METHOD, IMAGE INFORMATION PROCESSING PROGRAM, AND AUTOMOBILE

(75) Inventors: Kazunori Kanai, Wako (JP); Nobuharu Nagaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1104 days.

(21) Appl. No.: 11/289,119

(22) Filed: Nov. 29, 2005

(65) Prior Publication Data
US 2006/0115123 A1 Jun. 1, 2006

(30) Foreign Application Priority Data
Nov. 30, 2004 (JP) ............................. 2004-347736

(51) Int. Cl.
G06K 9/00 (2006.01)
(52) U.S. Cl. .................. 382/103; 382/104; 382/106; 382/107; 382/181; 701/300; 180/168; 180/169
(58) Field of Classification Search .......... 382/103, 382/104, 106, 107, 181; 340/435; 701/300; 180/168, 169
See application file for complete search history.

(56) References Cited

U.S. PATENT DOCUMENTS

| 5,386,285 | A | * | 1/1995 | Asayama | 356/4.01 |
| 5,670,935 | A | * | 9/1997 | Schofield et al. | 340/461 |
| 2002/0183929 | A1 | * | 12/2002 | Tsuji et al. | 701/301 |
| 2003/0021490 | A1 | * | 1/2003 | Okamoto et al. | 382/284 |
| 2003/0099375 | A1 | * | 5/2003 | Sefcik | 382/103 |
| 2004/0184638 | A1 | * | 9/2004 | Nobori et al. | 382/104 |

FOREIGN PATENT DOCUMENTS

| JP | 2002-298298 | | 10/2002 |
| JP | 2003-134508 | | 5/2003 |
| JP | 2004-206267 | | 7/2004 |
| JP | 2004206267 | A * | 7/2004 |

OTHER PUBLICATIONS

Jin, J.S.; Zhigang Zhu; Guangyou Xu; "A stable vision system for moving vehicles". Intelligent Transportation Systems, IEEE Transactions on vol. 1, Issue 1, Mar. 2000 pp. 32-39.*

(Continued)

*Primary Examiner*—Vikkram Bali
*Assistant Examiner*—Julian D Brooks
(74) *Attorney, Agent, or Firm*—Carrier Blackman & Associates P.C.; Joseph P. Carrier; William D. Blackman

(57) ABSTRACT

An image information processing system permits stable display of image information regarding an object on an image display device even if an image area of the object recognized through an infrared camera is unstable. In the image information processing system, a first image area recognition unit recognizes a first image area associated with an object on the basis of a second variable based on the position of the object measured through the infrared camera. Further, a second image area recognition unit estimates the first image area on the basis of a first variable and a second variable based on the running mode of an automobile, and recognizes the estimated image area as a second image area. Then, an image information control unit causes a head-up display to display one or both of the first image information associated with the first image area and the second image information associated with the second image area.

16 Claims, 9 Drawing Sheets

OTHER PUBLICATIONS

Yu-Ming Liang; Hsiao-Rong Tyan; Hong-Yuan Mark Liao; Sei-Wang Chen; "Stabilizing image sequences taken by the camcorder mounted on a moving vehicle". Intelligent Transportation Systems, 2003. Proceedings. 2003 IEEE vol. 1, 2003 pp. 90-95.*

* cited by examiner

IMAGE INFORMATION PROCESSING SYSTEM, IMAGE INFORMATION PROCESSING METHOD, IMAGE INFORMATION PROCESSING PROGRAM, AND AUTOMOBILE

BACKGROUND OF THE INVENTION

1. Field of the Invention

The present invention relates to a system and a method for processing an image of an object shot by an infrared camera mounted in a mobile body and displaying image information regarding the object on an image display device mounted in the mobile body, a program for imparting the image information processing function to a computer, and an automobile as the mobile body provided with the system.

2. Description of the Related Art

Hitherto, there has been proposed a technology whereby, based on an image of an object (human being) shot by an infrared camera mounted in an automobile, an image area associated with the object is displayed on an image display device mounted in the automobile (e.g., claim 1 of Japanese Unexamined Patent Application Publication No. 2003-134508).

There are some cases where image areas displayed on an image display device exhibit instability, such as a sudden change in their position, size or number, mainly because of the characteristics of infrared cameras, or because the relative motions of an automobile and an object are relatively rapid, or if an object is hidden behind another object.

For example, in a state wherein a rectangular image area A1 associated with a human being 01, which is an object, is being highlighted on an image display device, as shown in FIG. 5(a), if the light of a head lamp of an automobile 02 near the human being 01 is intensified, then the image area A1 associated with the head lamp is highlighted in some cases, as shown in FIG. 5(b) and FIG. 5(c). Furthermore, if the relative motions of the automobile and the human being 01 are rapid, as in a case where the automobile is running at a relatively high speed while turning left in the state shown in FIG. 5(a), then the recognition of the human being 01 sometimes fails to catch up with the relative motions, causing the image area A1 associated with the human being 01 to disappear from the image display device. Moreover, if a part of the body of the human being 01 is hid behind the automobile 02, then the image area A1 highlighted on the image display device reduces to include only a part of the body of the human being 01, as shown in FIG. 5(d), or the image area A1 disappears from the image display device, as shown in FIG. 5(e), in some cases. The instability of the image area A1 highlighted on the image display device described above may cause a driver or the like of the automobile, who watches the image display device, to feel insecure.

SUMMARY OF THE INVENTION

Accordingly, it is an object of the present invention to provide a system and a method permitting stable display of image information regarding an object on an image display device even if an image area of the object recognized through an infrared camera is unstable, a program that allows the function to be imparted to a computer, and an automobile equipped with the system.

To this end, an image information processing system in accordance with the present invention for processing an image of an object shot by an infrared camera mounted in a mobile body and then displaying image information on the object on an image display device mounted in the mobile body, includes a first variable measurement means for measuring a first variable based on a running mode of the mobile body, a second variable measurement means for measuring a second variable based on the position of the object through the infrared camera, a first image area recognition means for recognizing an image area associated with the object as a first image area on the basis of the second variable measured by the second variable measurement means, a second image area recognition means for estimating an image area recognized by the first image area recognition means on the basis of the first variable measured by the first variable measurement means and the second variable measured by the second variable measurement means and then recognizing the estimated image area as a second image area, and an image information control means for displaying, on the image display device, one or both of first image information associated with the first image area recognized by the first image area recognition means and second image information associated with the second image area recognized by the second image area recognition means.

According to the image information processing system in accordance with the present invention, the first image area recognition means recognizes the image area associated with an object as "the first image area" on the basis of the second variable for the position of the object measured by the second variable measurement means through the infrared camera. The second image area recognition means estimates the image area recognized by the first image area recognition means on the basis of the first variable based on the running mode of the mobile body measured by the first variable measurement means and the second variable measured by the second variable measurement means and then recognizes the estimated image area as "the second image area." Then, the image information control means displays, on the image display device, one or both of the first image information associated with the first image area recognized by the first image area recognition means and the second image information associated with the second image area recognized by the second image area recognition means.

With this arrangement, if the first image area recognized by the first image area recognition means is unstable, then the second image information associated with the second image area recognized by the second image area recognition means is displayed on the image display device in place of the first image area associated with the unstable first image area. The second image area is estimated as a stable first image area in view of the first variable based on the running mode of the mobile body and the second variable based on the position of the object. This makes it possible to obviate the instability of the image information on the object to be displayed on the image display device. In other words, according to the image information processing system in accordance with the present invention, even if the first image area associated with the object recognized through the infrared camera is unstable, the image information on the object can be stably displayed on the image display device.

Further, the image information processing system in accordance with the present invention includes a composite image area recognition means that combines the first and the second image areas recognized by the first and the second image area recognition means, respectively, and then recognizes the result as a composite image area, wherein the image information control means causes the image display device to display one of the first and the second image information associated with the first and the second image areas, or the composite image information associated with the composite image area of the first and the second image areas recognized by the composite image area recognition means.

The image information processing system in accordance with the present invention makes it possible to display, on the image display device, the composite image information reflecting the fact that the first image area associated with the object has been recognized by the first image area recognition means and the fact that the second image area has been estimated by the second image area recognition means as a more stable first image area.

Furthermore, in the image information processing system in accordance with the present invention, the image information control means causes the image display device to display composite image information associated with the composite image area of the first and the second image areas if the first and the second image areas have an overlapping portion.

Furthermore, in the image information processing system in accordance with the present invention, the second image area recognition means estimates the second variable, which would be measured by the second variable measurement means in the future, on the basis of the first variable measured by the first variable measurement means and the second variable measured by the second variable measurement means, and then recognizes the second image area on the basis of the estimated second variable.

Furthermore, in the image information processing system in accordance with the present invention, the second variable measurement means performs measurement, taking a part or all of the second variable as a quaternion indicating the position of the object, and the second image area recognition means estimates the second variable by using a quaternion expressing a spatial displacement based on the first variable measured by the first variable measurement means and the second variable measured by the second variable measurement means.

Furthermore, in the image information processing system in accordance with the present invention, the first variable measurement means measures the speed of the mobile body and the angular velocity about a certain axis as first variables, and the second image area recognition means estimates the second variable by using a quaternion that expresses a turning motion specified by the speed and the angular velocity measured by the first variable measurement means.

Furthermore, in the image information processing system in accordance with the present invention, if the second variable measured by the second variable measurement means is unstable, then the second image area recognition means recognizes the second image area on the basis of the second variable measured by the second variable measurement means before such unstableness.

The image information processing system in accordance with the present invention makes it possible to avoid the recognition of the second image area on the basis of an unstable second variable, thus allowing a stable second image area to be recognized.

Furthermore, in the image information processing system in accordance with the present invention, the second image area recognition means determines that the second variable is unstable if the measurement of the second variable by the second variable measurement means is disabled, or a variation amount of the second variable measured by the second variable measurement means exceeds a threshold value.

Furthermore, in the image information processing system in accordance with the present invention, if the first image area recognized by the first image area recognition means is stable, then the image information control means causes the first image information associated with the first image area to be displayed on the image display device, whereas, if the first image area recognized by the first image area recognition means is unstable, then the image information control means causes the second image information associated with the second image area recognized by the second image area recognition means to be displayed on the image display device.

According to the image information processing system in accordance with the present invention, if the first image area is stable, then the first image information associated with the stable first image area is displayed on the image display device. If the first image area is unstable, then the second image information associated with the second image area estimated as a stable first image area is displayed on the image display device in place of the unstable first image area. With this arrangement, even if the first image area associated with the object recognized through the infrared camera is unstable, the image information on the object can be stably displayed on the image display device.

Furthermore, in the image information processing system in accordance with the present invention, the image information control means determines that the first image area is unstable if the difference between or the mean value of one or a plurality of representative points of the first image area recognized by the first image area recognition means and one or a plurality of representative points of the second image area recognized by the second image area recognition means exceeds a threshold value.

According to the image information processing system in accordance with the present invention, if the difference between a representative point of the first image area and a representative point of the second image area is a threshold value or less, then it is determined that the first image area is stable and the first image information associated with the first image area is displayed on the image display device. If the difference exceeds the threshold value, then it is determined that the first image area is unstable, and the second image information associated with the second image area in place of the first image area is displayed on the image display device.

An image information processing method in accordance with the present invention for solving the aforesaid problem is a method for processing an image of an object shot by an infrared camera mounted in a mobile body and then displaying image information on the object on an image display device mounted in the mobile body, the method comprising a first variable measurement step for measuring a first variable based on a running mode of the mobile body, a second variable measurement step for measuring a second variable based on the position of the object through the infrared camera, a first image area recognition step for recognizing an image area associated with the object as a first image area on the basis of the second variable measured by the second variable measurement step, a second image area recognition step for estimating an image area recognized in the first image area recognition step on the basis of the first variable measured in the first variable measurement step and the second variable measured in the second variable measurement step and then recognizing the estimated image area as a second image area, and an image information control step for causing the image display device to display one or both of first image information associated with the first image area recognized in the first image area recognition step and second image information associated with the second image area recognized in the second image area recognition step.

The image information processing method in accordance with the present invention allows the image information on an object to be stably displayed on an image display device even if the first image area associated with the object recognized through an infrared camera is unstable.

An image information processing program in accordance with the present invention for solving the aforesaid problem is a program for imparting to a computer a function for processing an image of an object shot by an infrared camera mounted in a mobile body and then displaying image information on the object on an image display device mounted in the mobile body, the function comprising a first variable measurement function for measuring a first variable based on a running mode of the mobile body, a second variable measurement function for measuring a second variable based on the position of the object through the infrared camera, a first image area recognition function for recognizing an image area associated with the object as a first image area on the basis of the second variable measured by the second variable measurement function, a second image area recognition function for estimating an image area recognized by the first image area recognition function on the basis of the first variable measured by the first variable measurement function and the second variable measured by the second variable measurement function and then recognizing the estimated image area as a second image area, and an image information control function for causing the image display device to display one or both of first image information associated with the first image area recognized by the first image area recognition function and second image information associated with the second image area recognized by the second image area recognition function.

The image information processing program in accordance with the present invention allows a computer to be provided with a function that makes it possible to stably display the image information on an object, which has been recognized by an infrared camera, on an image display device even if the first image area associated with the object recognized through an infrared camera is unstable.

An automobile in accordance with the present invention for solving the aforesaid problem has, as the mobile body, the aforesaid image information processing system.

The automobile in accordance with the present invention allows the image information on an object to be stably displayed on an image display device even if the first image area associated with the object recognized through an infrared camera is unstable, thus enabling a driver or the like of the mobile body to securely recognize the existence of the object.

DESCRIPTION OF THE PREFERRED EMBODIMENTS

Embodiments of the image information processing system, method, and program, and an automobile in accordance with the present invention will be explained in conjunction with the accompanying drawings.

Figure 1:
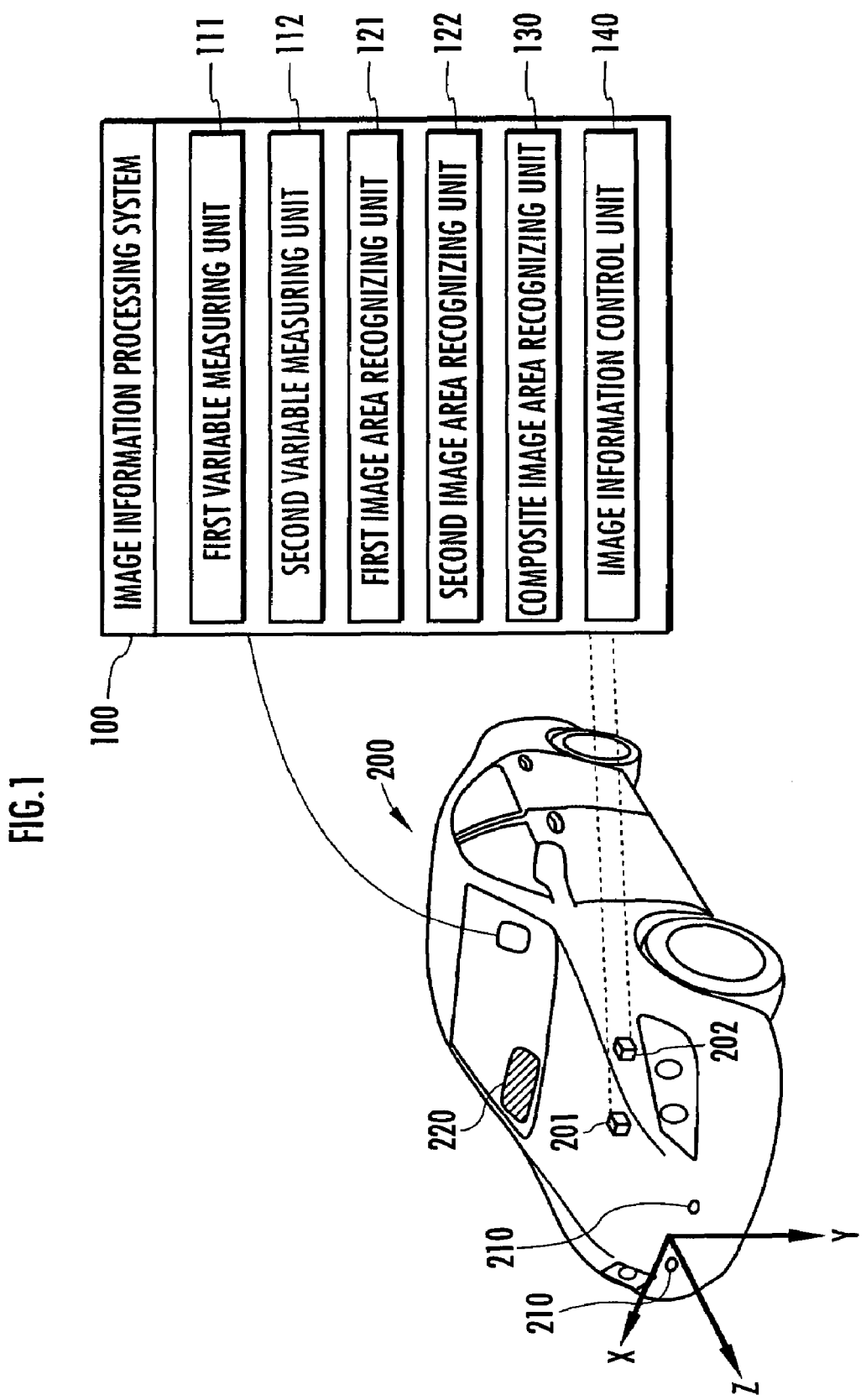
FIG. 1 is an explanatory diagram showing the construction of an image information processing system in accordance with the present invention.
Figure 2:
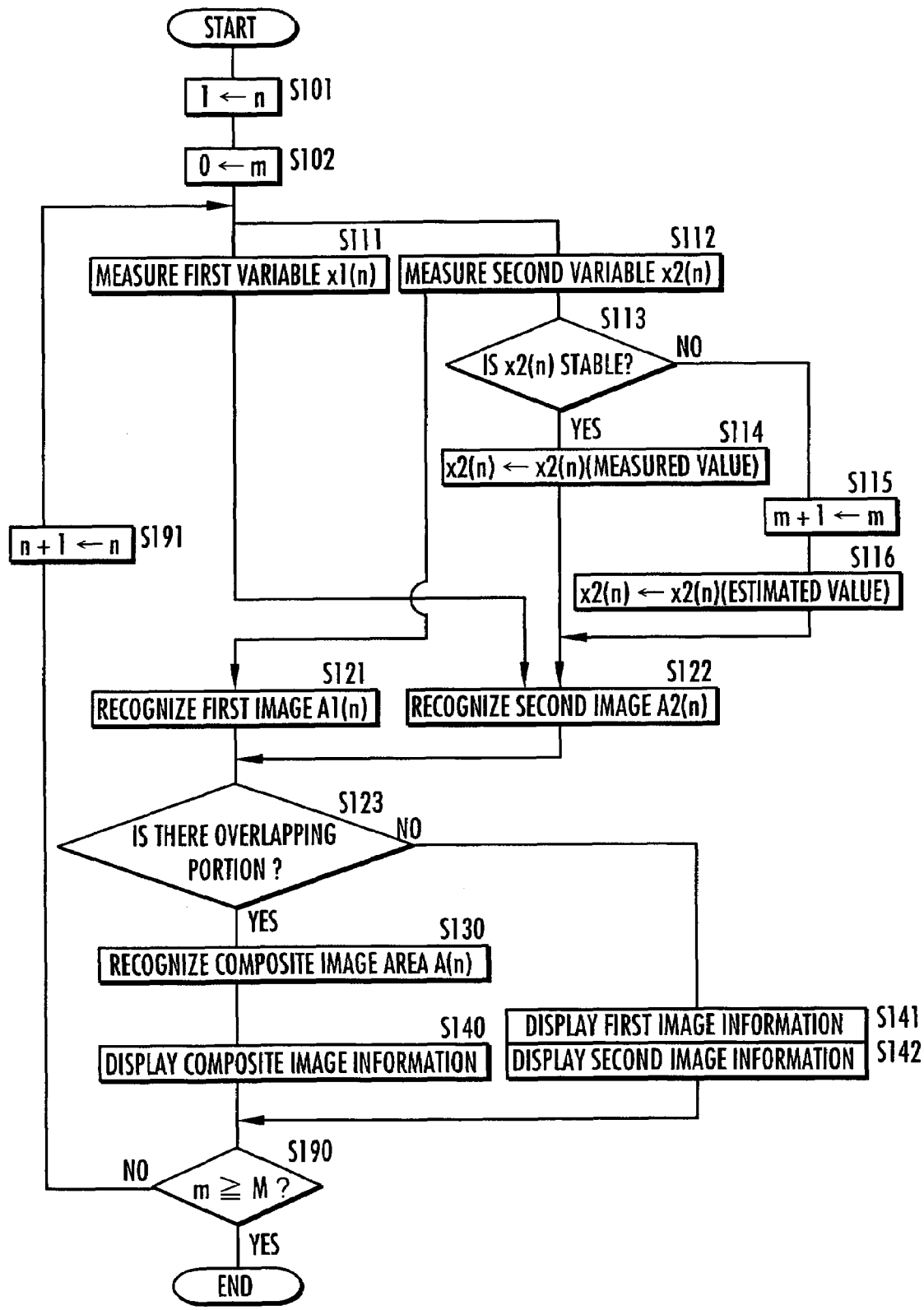
FIG. 2 is an explanatory diagram showing an image information processing method according to a first embodiment of the present invention.
Figure 3:
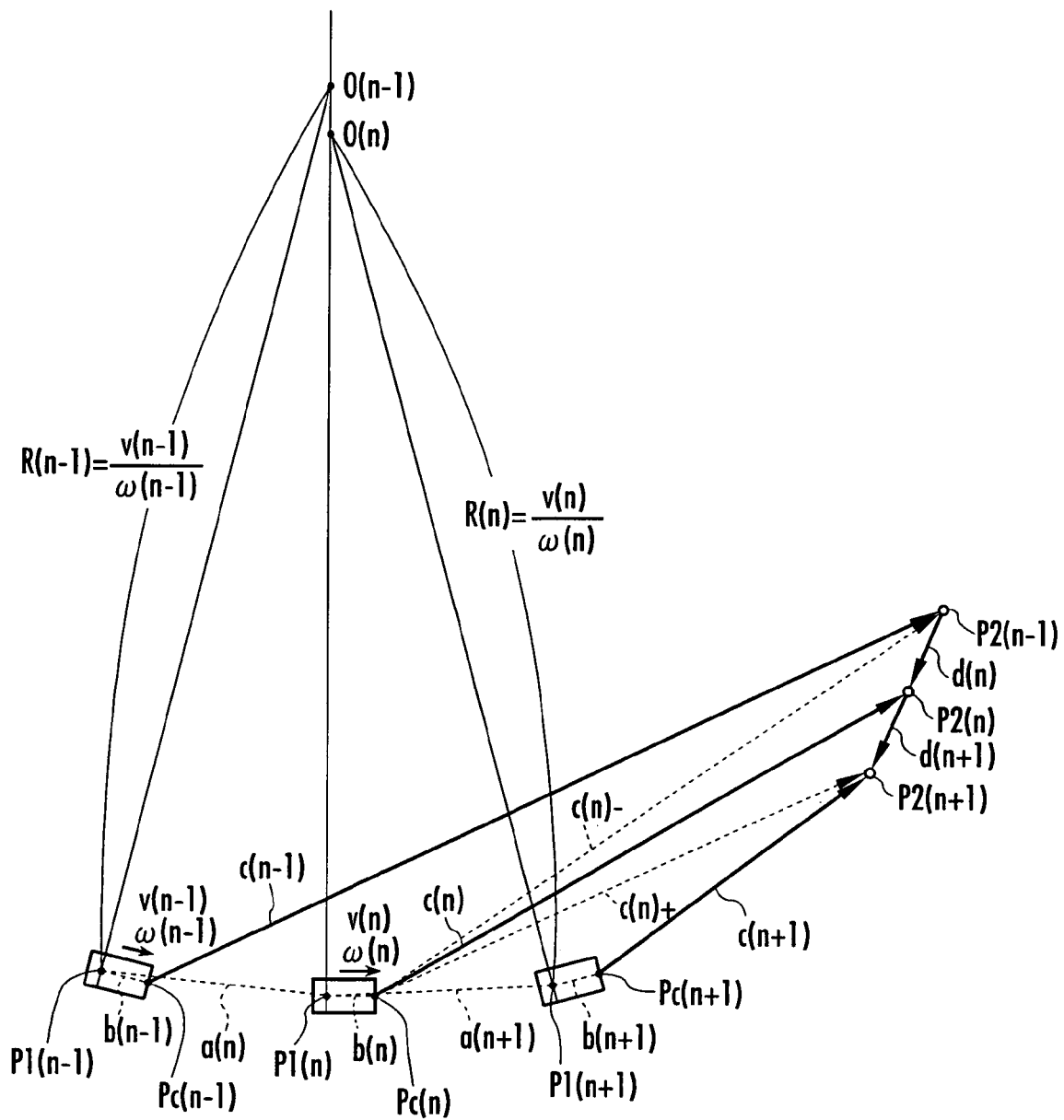
FIG. 3 is an explanatory supplemental diagram showing the processing of recognizing a second image area.
Figure 4A:
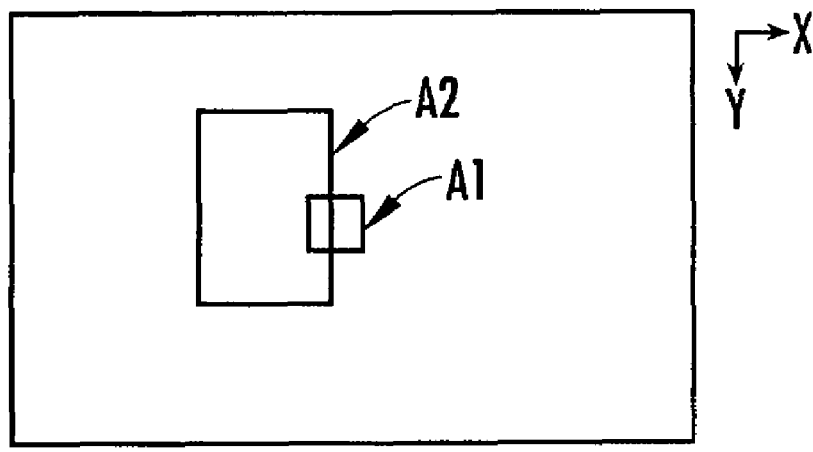
FIGS. 4(a), 4(b), and 4(c) are explanatory supplemental diagrams illustrating the processing performed according to the presence/absence of an overlapping portion of first and second image areas.
Figure 4B:
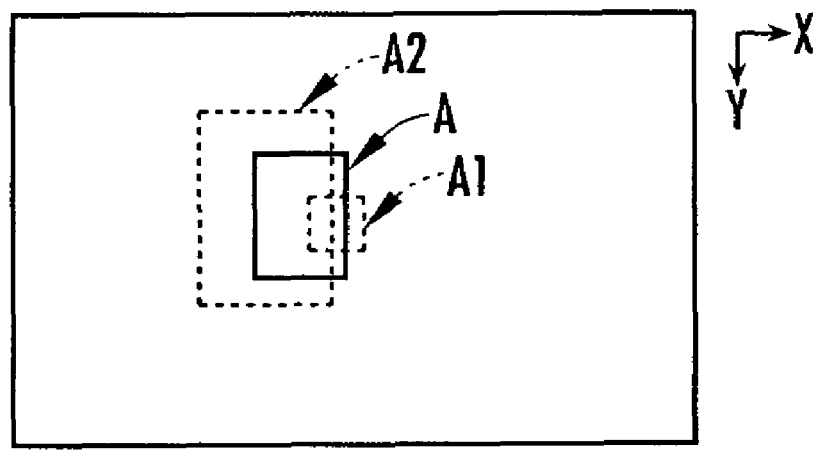
Figure 4C:
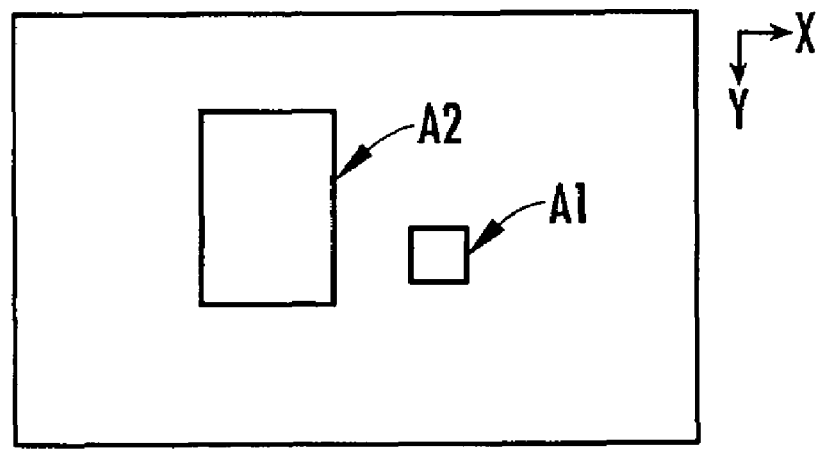
Figure 8:
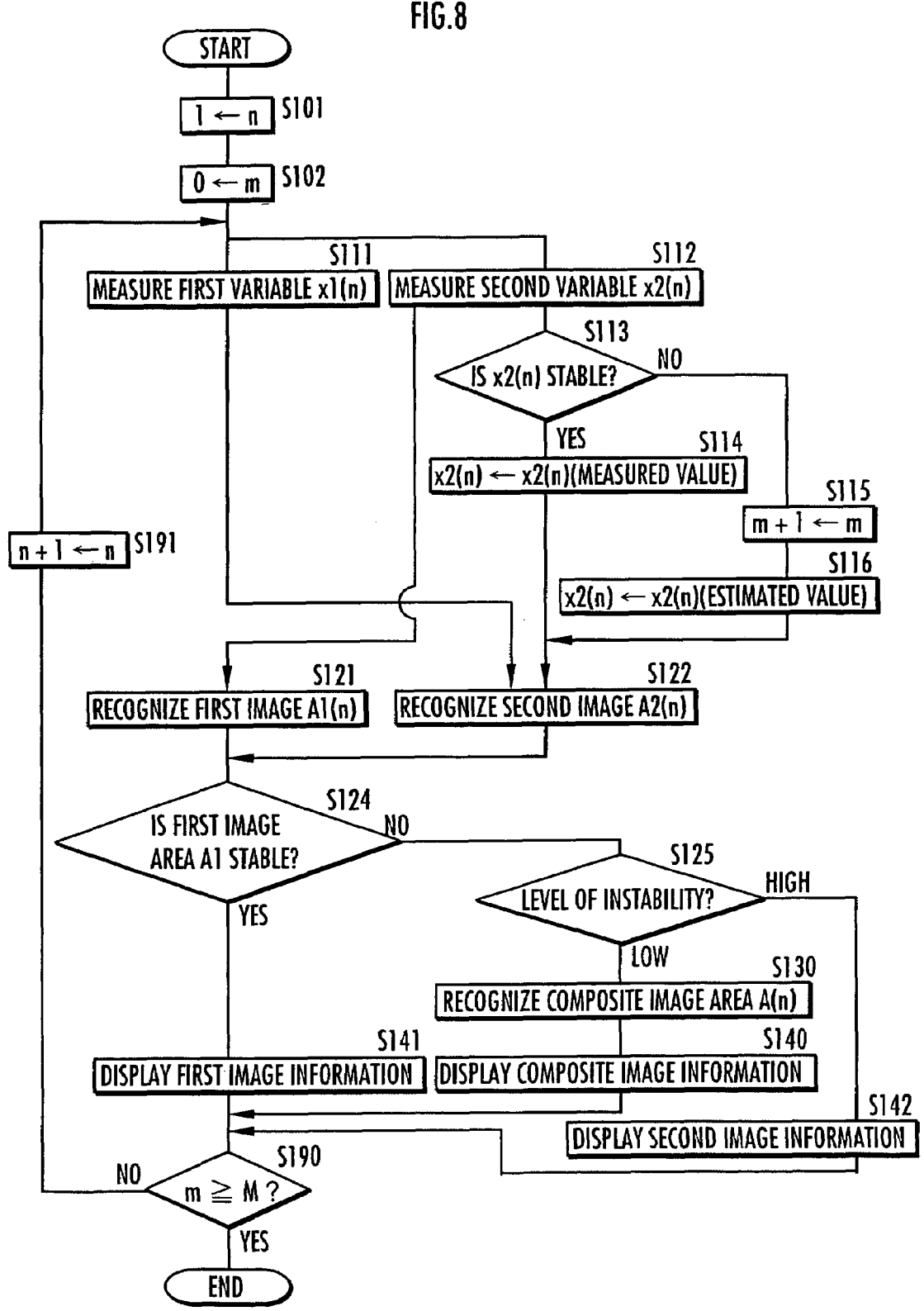
FIG. 8 is an explanatory diagram of an image information processing method according to a second embodiment of the present invention.

FIG. 1 is an explanatory diagram showing the construction of an image information processing system in accordance with the present invention, FIG. 2 is an explanatory diagram showing an image information processing method according to a first embodiment of the present invention, FIG. 3 is an explanatory supplemental diagram showing the processing of recognizing a second image area, FIGS. 4(a), 4(b), and 4(c) are explanatory supplemental diagrams illustrating the processing performed according to the presence/absence of an overlapping portion of first and second image areas, FIGS. 5(a), 5(b), 5(c), 5(d), and 5(e) are diagrams showing examples of the first image area, FIGS. 6(a), 6(b), 6(c), 6(d), and 6(e) are diagrams showing examples of the second image area, FIGS. 7(a), 7(b), 7(c), 7(d), and 7(e) are diagrams showing examples of a composite image area created by the image information processing method according to the first embodiment of the present invention, FIG. 8 is an explanatory diagram of an image information processing method according to a second embodiment of the present invention, and FIGS. 9(a), 9(b), 9(c), 9(d), and 9(e) are diagrams showing examples of a composite image area created by the image information processing method according to the second embodiment of the present invention.

An information providing system 100 shown in FIG. 1 is installed at an appropriate position in an automobile (mobile body) 200. The automobile 200 is equipped with a vehicle speed sensor 201 that outputs signals based on vehicle speed v, and a yaw rate sensor 202 that outputs signals based on an angular velocity ω of the automobile 200 about a perpendicular axis passing the rear wheel axle. Two infrared cameras 210 are installed at right and left, respectively, on the front of the automobile 200. Further, a head-up display (HUD), which is an image display device, 220 is installed on the wind shield of the automobile 200 at a position that does not block the front view of a driver.

An image information processing system 100 includes a first variable measurement unit 111, a second variable measurement unit 112, a first image area recognition unit 121, a second image area recognition unit 122, a composite image area recognition unit 130, and an image information control unit 140. Each unit is constructed of hardware, including a CPU, a ROM, and a RAM, and software, namely, an image information processing program in accordance with the present invention for imparting the function for executing the image information processing method, which will be discussed later, to the aforesaid hardware.

Based on the outputs of the vehicle speed sensor 201 and the yaw rate sensor 202, respectively, the first variable measurement unit 111 measures the vehicle speed v and the angular velocity ω of the automobile 200 about the perpendicular axis passing the rear wheel axle as a first variable X1 associated with the running mode of the automobile 200.

Through one or both of the two infrared cameras 210, the second variable measurement unit 112 measures the distance to an object, using the infrared camera 210 as the reference, and the position defined by lengthwise and crosswise directions and the size of the object as the second variables X2 associated with the position of the object.

The first image area recognition unit 121 recognizes an image area associated with the object as a first image area A1 on the basis of the second variables X2 measured by the second variable measurement unit 112.

Based on the first variable X1 measured by the first variable measurement unit 111 and the second variables X2 measured by the second variable measurement unit 112, the second image area recognition unit 122 estimates an image area recognized by the first image area recognition unit 121 and recognizes the estimated image area as a second image area A2.

The composite image area recognition unit 130 combines the first image area A1 recognized by the first image area recognition unit 121 and the second image area A2 recognized by the second image area recognition unit 122, and recognizes the composite image area as a composite image area A.

The image information control unit 140 causes the HUD 220 to display a first box enclosing the first image area A1 recognized by the first image area recognition unit 121 as "first image information." The image information control unit 140 also causes the HUD 220 to display a second box enclosing the second image area A2 recognized by the second image area recognition unit 122 as "second image information." Furthermore, the image information control unit 140 causes the HUD 220 to display a box enclosing the composite image area A recognized by the composite image area recognition unit 130 as "composite image information."

Referring to FIG. 2 to FIG. 7, the image information processing method according to a first embodiment of the present invention executed by the image information processing system having the aforesaid construction will be explained.

First, at a predetermined timing, the number of control cycles n is reset to "1" at S101 and a cumulative number m of determinations in which the second variables X2 have been judged to be unstable is reset to "0" (S102). The predetermined timing is defined as, for example, the moment when the first image area A1 recognized by the first image area recognition unit 121 is recognized to be associated with a predetermined object, such as a human being or an automobile.

The first variable measurement unit 111 measures a vehicle speed v(n) and an angular velocity ω(n) as first variables X1(n) in S111. Concurrently, through the infrared cameras 210, the second variable measurement unit 112 measures the distance to the object and the position in lengthwise and crosswise directions and size of the object as second variables X2(n) in S112. As the measuring method of the second variables X2(n), the one disclosed, for example, in Japanese Unexamined Patent Application Publication No. 2002-298298, may be used, so that no detailed explanation of the measuring method will be given herein.

The first image area recognition unit 121 recognizes the image area associated with the object as a first image area A1 on the basis of the second variables X2(n) measured by the second variable measurement unit 112 (S121). Thus, the rectangular first image area A1 that changes as shown in, for example, FIG. 5(a) to FIG. 5(e), is recognized. As the method for recognizing the first image area A1, a general technique in a three-dimensional image processing field, such as the one disclosed in, for example, Japanese Unexamined Patent Application Publication No. 2002-298298, may be used, so that no detailed explanation of the measuring method will be given herein.

Before recognizing the second image area A2(n) to be discussed later (S122), the second image area recognition unit 122 determines whether the second variables X2(n) are stable or unstable (S113). Specifically, if the second variables X2(n) are measurable or the variation amounts thereof ($\delta$=|X2(n)−X2(n−1)|) are a threshold value $\epsilon$ (>0) or less, then it is determined that the second variables X2(n) are stable (YES in S113). If the second variables X2(n) are immeasurable (or not measured) or the variation amounts $\delta$ exceed the threshold value $\epsilon$, then it is determined that the second variables X2(n) are unstable (NO in S113).

Subsequently, if the second variables X2(n) have been determined to be stable (YES in S113), then the second image area recognition unit 122 decides the second variables X2(n) (measured values) as the second variables X2(n) in the current control cycle n in S114 and then recognizes a second image area A2(n) in S122. Conversely, if the second variables X2(n) have been determined to be unstable (NO in S113), then the second image area recognition unit 122 increments the number of determinations m by 1 in S115, and decides the second variable X2(n)(estimated value) at time n estimated by the second image area recognition unit 122 at a previous control cycle n−1 according to the procedure, which will be discussed later, as the current second variables X2(n) in S116, and then recognizes the second image area A2(n) in S122.

To recognize the second image area A2(n) in S122, the second image area recognition unit 122 estimates an object position p2(n+1) relative to a camera position pc(n+1) at time n+1 (future) as a part of a second variable X2(n+1) on the basis of a vehicle speed v(n−1), an angular velocity ω(n−1), and an object position p2(n−1) relative to a camera position pc(n−1) at time (indicated by the number of control cycle) n−1 (past) and a vehicle speed v(n), an angular velocity ω(n), and an object position p2(n) relative to a camera position pc(n) at time n (present). When estimating the second variable X2(n+1), a vehicle position p1(i), a camera position pc(i), and an object position p2(i) in a three-dimensional space wherein an X axis, a Y axis, and a Z axis are defined in a lateral direction, a vertical direction, and a longitudinal direction, respectively, of the automobile 200 as shown in FIG. 1, are all expressed in terms of quaternion (four-dimensional numbers).

The method for estimating the object position p2(n+1) relative to the camera position pc(n+1) will be explained in detail in conjunction with FIG. 3.

The object position p2(n−1) relative to the camera position pc(n) is determined on the basis of the fact that the vector extending from the camera position pc(n) to the object position p2(n−1) (see arrow c(n) in FIG. 3) is expressed by a composite vector of (1) the vector extending from the camera position pc(n) to the vehicle position p1(n) (see a dashed line b(n) in FIG. 3), (2) the vector extending from the vehicle position p1(n) to the vehicle position p1(n−1) (see a dashed line a(n) in FIG. 3), (3) the vector extending from the vehicle position p1(n−1) to the camera position pc(n−1) (see a segment b(n−1) in FIG. 3), and (4) the vector extending from the camera position pc(n−1) to the object position p2(n−1) (see an arrow c(n−1) in FIG. 3).

The vector extending from the camera position pc(n) to the vehicle position p1(n) (see the dashed line b(n) in FIG. 3) is determined on the basis of the data on the positional relationship between the center of the rear wheel axle and the infrared cameras 210, which has been stored in a memory.

The vector extending from the vehicle position p1(n) to the vehicle position p1(n−1) (see a dashed line a(n) in FIG. 3) is determined on the assumption that the automobile 200 has been in a turning motion for an extremely short time δt from time n−1 to time n. Specifically, based on the vehicle speed v(n−1) and the angular velocity ω(n−1) measured at time n−1 by the first variable measurement unit 111, a turning axis O(n−1) positioned on an extended line of the rear wheel axle and the turning radius, which is the distance from the center of the rear wheel axle of the automobile 200 to the turning axis O(n−1), R(n−1)(=v(n−1)/ω(n−1)), are determined. Further, based on the vehicle position p1(n), the vehicle position p1(n−1) is determined according to the following equation (1) that includes a quaternion Qn− and its conjugate quaternion Qn−* for representing a turn about the turning axis O(n−1). Thus, the vector extending from the vehicle position p1(n) to the vehicle position p1(n−1) is determined (see the dashed line a(n) in FIG. 3).

$$p1(n-1) = Q-*p1(n)Q-$$

$$Qn-= [0, -\sin\{\omega(n-1)\delta t/2\}, 0, \cos\{\omega(n-1)\delta t/2\}],$$

$$Qn-* = [0, \sin\{\omega(n-1)\delta t/2\}, 0, \cos\{\omega(n-1)\delta t/2\}] \quad (1)$$

(3) The vector extending from the vehicle position p1(n−1) to the camera position pc(n−1) (see the segment b(n−1) in FIG. 3) is determined on the basis of the posture of the vehicle at time n−1 determined on condition that the extended line of the rear wheel axle is on the turning axis O(n−1), and the data on the positional relationship between the center of the rear wheel axle and the positions of the infrared cameras 210 stored in the memory.

(4) The vector extending from the camera position pc(n−1) to the object position p2(n−1) (see the arrow c(n−1) in FIG. 3) is determined according to the second variable associated with the position of the object measured by the second variable measurement unit 112 on the basis of an image of the object shot by the infrared camera 210 at time n−1.

Thus, the vector extending from the camera position pc(n) to the object position p2(n−1) (see the arrow c(n)− in FIG. 3) and eventually the object position p2(n−1) relative to the camera position pc(n) are determined.

An object position p2(n+1) relative to the camera position pc(n) is estimated on the basis of the fact that the vector extending from the camera position pc(n) to the object position p2(n+1) (see an arrow c(n)+ in FIG. 3) is expressed by a composite vector of (5) the vector extending from the camera position pc(n) to the object position p2(n) (see an arrow c(n) in FIG. 3) and (6) the vector extending from the object position p2(n) to an object position p2(n+1) (see an arrow d(n+1) in FIG. 3).

(5) The vector extending from the camera position pc(n) to the object position p2(n) (see the arrow c(n) in FIG. 3) is determined by the second variable measured at time n by the second variable measurement unit 112 on the basis of an image of the object shot by the infrared camera 210 at time n.

(6) The vector extending from the object position p2(n) to an object position p2(n+1) (see an arrow d(n+1) in FIG. 3) is determined as a vector having the same size and direction as those of the vector extending from an object position p2(n−1) to the object position p2(n) (see an arrow d(n) in FIG. 3), the start point thereof being the object position p2(n), on the assumption that the object performs the same motion as that during an extremely short time δt from time n−1 to time n over the extremely short time δt from time n to time n+1.

Thus, the vector extending from the camera position pc(n) to the object position p2(n+1) (see the arrow c(n)+ in FIG. 3) and eventually the object position p2(n+1) relative to the camera position pc(n) are determined.

Further, the object position p2(n+1) relative to the camera position pc(n+1) is determined on the basis of the fact that the vector extending from the camera position pc(n+1) to the object position p2(n+1) (see arrow c(n+1) in FIG. 3) is expressed by a composite vector of (7) the vector extending from the camera position pc(n+1) to the vehicle position p1(n+1) (see a dashed line b(n+1) in FIG. 3), (8) the vector extending from the vehicle position p1(n+1) to the vehicle position p1(n) (see a dashed line a(n+1) in FIG. 3), (9) the vector extending from the vehicle position p1(n) to the camera position pc(n) (see a segment b(n) in FIG. 3), and (10) the vector extending from the camera position pc(n) to the object position p2(n+1) (see an arrow c(n+1) in FIG. 3).

(7) The vector extending from the camera position pc(n) to the vehicle position p1(n) (see the dashed line b(n+1) in FIG. 3) is determined on the basis of the posture of the vehicle at time n+1 determined on condition that the extended line of the rear wheel axle is on the turning axis O(n) to be described later, and the data on the positional relationship between the center of the rear wheel axle and the positions of the infrared cameras 210 stored in the memory. This vector (7) is determined after a vector (8) discussed below is determined.

(8) The vector extending from the vehicle position p1(n+1) to the vehicle position p1(n) (see a dashed line a(n+1) in FIG. 3) is determined on the assumption that the automobile 200 will be in a turning motion for an extremely short time δt from time n to time n+1. Specifically, first, based on the vehicle speed v(n) and the angular velocity ω(n) measured at time n by the first variable measurement unit 111, a turning axis O(n) positioned on an extended line of the rear wheel axle and the turning radius, which is the distance from the center of the rear wheel axle of the automobile 200 to the turning axis O(n), R(n) (=v(n)/ω(n)), are determined. Further, based on the vehicle position p1(n), the vehicle position p1(n+1) is determined according to the following equation (2) that includes a quaternion Qn+ and its conjugate quaternion Qn+* for representing a turn about the turning axis O(n). Thus, the vector extending from the vehicle position p1(n+1) to the vehicle position p1(n) is determined (see the dashed line a(n+1) in FIG. 3).

$$p1(n+1) = Qn+*p1(n)Qn+$$

$$Qn+ = [0, \sin\{\omega(n)\delta t/2\}, 0, \cos\{\omega(n)\delta t/2\}],$$

$$Qn+* = [0, -\sin\{\omega(n)\delta t/2\}, 0, \cos\{\omega(n)\delta t/2\}] \quad (2)$$

(9) The vector extending from the vehicle position p1(n) to the camera position pc(n) (see the segment b(n) in FIG. 3) is determined on the basis of the data regarding the positional relationship between the center of the rear wheel axle and the infrared cameras 210 stored in the memory.

(10) The vector extending from the camera position pc(n) to the object position p2(n+1) (see an arrow c(n+1) in FIG. 3) that has been determined previously is used.

Thus, the vector extending from the camera position pc(n+1) to the object position p2(n+1) (see the arrow c(n+1) in FIG. 3) and eventually the object position p2(n+1) relative to the camera position pc(n+1) are determined. The second image area recognition unit 122 estimates a first image area A(n+1) recognized by the first image area recognition unit 121 at time n+1 (future) according to the same method as that used by the first image area recognition unit 121 described previously on the basis of an object position p2(n+1) relative to a camera position pc(n+1) at time n+1 (future), and recognizes the estimated first image area A(n+1) as a second image area A2. Thus, the rectangular second image area A2 that changes as shown in, for example, FIG. 6(*a*) to FIG. 6(*e*), is recognized.

Subsequently, the image information control unit 140 determines whether there is an overlapping portion between the first image area A1(n) recognized by the first image area recognition unit 121 and the second image area A2(n) recognized by the second image area recognition unit 122 (S123).

If the image information control unit 140 determines that there is an overlapping portion (YES in S123), then the composite image area recognition unit 130 combines the first image area A1(n) and the second image area A2(n) and recognizes the result as a composite image area A (S130). More specifically, an area using the average or the weighted average of the coordinates of the representative points of the first image area A1 and the second image area A2, respectively, as the coordinate of its representative point is recognized as the composite image area A of the two image areas. If the first image area A1 and the second image area A2 are expressed by vectors, then the composite image area A is recognized according to the following expression (3).

$$A = C1 \cdot A1 + C2 \cdot A2 \ (C1 > 0, C2 > 0, C1 + C2 = 1) \quad (3)$$

A first weighting factor C1 and a second weighting factor C2 indicating how much of the first image area A1 and the second image area A2 are reflected on the composite image area A may be variably set according to factors, such as a difference, of a first image area A1(n) and a second image area A2(n) at a current control cycle n, using a first image area A1(n−1) at the last control cycle n−1 as the reference.

Further, the image information control unit 140 causes the HUD 220 to display a composite box enclosing the composite image area A (composite image information) in S140. For instance, if the rectangular first image area A1 recognized by the first image area recognition unit 121 and the rectangular second image area A2 recognized by the second image area recognition unit 122 overlap, as shown in FIG. 4(*a*), then the HUD 220 displays a composite box enclosing a rectangular composite image area A shown in FIG. 4(*b*) that uses the average or the weighting average of the coordinates of the four corners (representative points) of both image areas as the coordinates of its four corners (refer to S130 and S140).

If the image information control unit 140 determines that there is no overlapping portions (NO in S123), then it causes the HUD 220 to display a first box (first image information) enclosing the first image area A1 (S141) and a second box (second image information) enclosing the second image area A2 (S142). For instance, if the rectangular first image area A1 recognized by the first image area recognition unit 121 and the rectangular second image area A2 recognized by the second image area recognition unit 122 do not overlap, as shown in FIG. 4(*c*), then the HUD 220 displays the first box enclosing the first image area A1 and the second box enclosing the second image area A2, as shown in FIG. 4(*c*) (refer to S141 and S142). If the first image area A1 is not recognized, then the first box will not be displayed on the HUD 220. Similarly, if the second image area A2 is not recognized, then the second box will not be displayed on the HUD 220.

Thereafter, if the number of determinations m of the second variable X2(n) being unstable is below a predetermined value M (NO in S190), then the number of control cycles n is incremented by 1 (S191), and the aforesaid processing, such as the measurement of the first parameters X1(n) in S111 and the measurement of the second parameters X2(n) in S112, is repeated. If the number of determinations m is the predetermined value M or more (YES in S190), then the processing the image information on the object is terminated.

According to the image information processing method in accordance with the first embodiment of the present invention, if the first image area A1, which changes as illustrated in FIG. 5(*a*) to FIG. 5(*e*), is recognized by the first image area recognition unit 121, while the second image area A2, which changes as illustrated in FIG. 6(*a*) to FIG. 6(*e*), is recognized by the second image area recognition unit 122, then the box (image information) displayed on the HUD 220 changes as illustrated in FIG. 7(*a*) to FIG. 7(*e*).

In other words, if the first image area A1 shown in FIG. 5(*a*) and the second image area A2 shown in FIG. 6(*a*) are the same, i.e., if they completely overlap each other, then a composite box enclosing the composite image area A that is the same as the first image area A1 and the second image area A2 is displayed on the HUD 220, as shown in FIG. 7(*a*).

If there is no overlapping portion between the first image area A1 shown in FIG. 5(*b*) and the second image area A2 shown in FIG. 6(*b*), then a first box enclosing the first image area A1 and a second box enclosing the second image area A2 are separately displayed on the HUD 220, as shown in FIG. 7(*b*). Similarly, if there is no overlapping portion between the first image area A1 shown in FIG. 5(*c*) and the second image area A2 shown in FIG. 6(*c*), then the first box enclosing the first image area A1 and the second box enclosing the second image area A2 are separately displayed on the HUD 220, as shown in FIG. 7(*c*).

If the first image area A1 shown in FIG. 5(*d*) and the second image area A2 shown in FIG. 6(*d*) have an overlapping portion, then a composite box enclosing the first image area A1 and the second image area A2 is displayed on the HUD 220, as shown in FIG. 7(*d*).

If the first image area A1 is not recognized as shown in FIG. 5(*e*), while the second image area A2 is recognized as shown in FIG. 6(*e*), then only the second box enclosing the second image area A2 is displayed on the HUD 220 as shown in FIG. 7(*e*).

Even if the first image area A1 associated with the object recognized through the infrared camera 210 is unstable (see FIG. 5(*a*) to FIG. 5(*e*)), the image information processing method in accordance with the first embodiment of the present invention carried out by the image information processing system 100 in accordance with the present invention makes it possible to stably display the box of an image area associated with an object on the HUD 220 (see FIG. 7(*a*) to FIG. 7(*e*)).

Referring now to FIG. 5, FIG. 6, FIG. 8, and FIG. 9, an image information processing method according to a second embodiment of the present invention carried out by an image information processing system having the aforesaid construction will be explained.

The image information processing method according to the second embodiment of the present invention shares the same processing as that of the image information processing method according to the first embodiment except for the processing for determining whether the first image area A1 and the second image area A2 have an overlapping portion (see S123) and the image information processing based on the determination result (see S130, and S140 to S142) in the image information processing method according to the first embodiment in the present invention. Hence, the explanation of the same processing will not be repeated.

According to the image information processing method in accordance with the second embodiment, a first image area recognition unit 121 recognizes a first image area A1(n) in S121, a second image area recognition unit 122 recognizes a second image area A2(n) in S122, and then an image information control unit 140 determines in S124 whether the first image area A1(n) is stable or unstable. Specifically, if the absolute value of a difference δA(n) between the first image area A1(n) and the second image area A2(n), more specifically, the difference (distance) in the representative point, the difference in area or the average or the weighted average or the like of both differences, is a primary threshold value ε1 or less, then it is determined that the first image area A1(n) is stable. Conversely, if the difference δA(n) exceeds the primary threshold value ε1, then it is determined that the first image area A1(n) is unstable.

If it is determined that the first image area A1(n) is stable (YES in S124), then the image information control unit 140 causes the HUD 220 to display the first box enclosing the first image area A1(n) (the first image information) in S141.

If it is determined that the first image area A1(n) is unstable (NO in S124), then the image information control unit 140 determines the level of the instability in S125. Specifically, if the difference δA(n) is not more than a secondary threshold value ε2, which is larger than the primary threshold value ε1, then it is determined that the instability is low, while if the difference δA(n) exceeds the secondary threshold value ε2, then it is determined that the instability is high.

If the image information control unit 140 determines that the instability of the first image area A1(n) is low (YES in S125), then the composite image area recognition unit 130 recognizes a composite image area A(n) in S130, and the image information control unit 140 causes a composite box enclosing the composite image area A(n) to be displayed on the HUD 220 in S140. Conversely, if the image information control unit 140 determines that the instability of the first image area A1(n) is high (NO in S125), then the image information control unit 140 causes a second box enclosing a second image area A2(n) to be displayed on the HUD 220 in S142.

According to the image information processing method in accordance with the second embodiment of the present invention, if the first image area A1, which changes as shown in FIG. 5(a) to FIG. 5(e), is recognized by the first image area recognition unit 121, and the second image area A2, which changes as shown in FIG. 6(a) to FIG. 6(e), is recognized by the second image area recognition unit 122, then the box (image information) displayed on the HUD 220 changes as shown in FIG. 9(a) to FIG. 9(e).

Figure 5A:
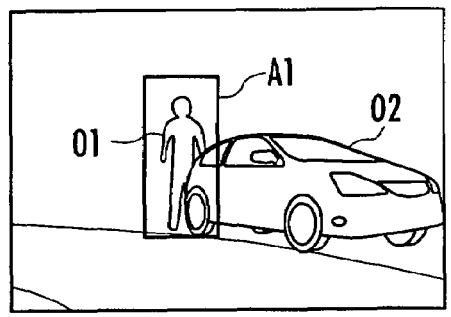
FIGS. 5(a), 5(b), 5(c), 5(d), and 5(e) are diagrams showing examples of the first image area.
Figure 6A:
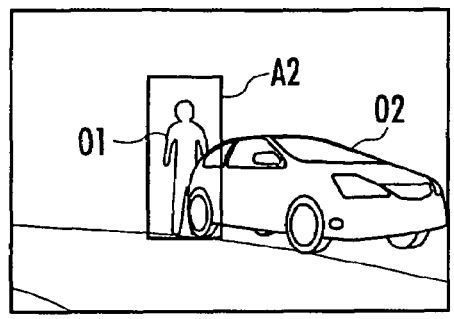
FIGS. 6(a), 6(b), 6(c), 6(d), and 6(e) are diagrams showing examples of the second image area.
Figure 9A:
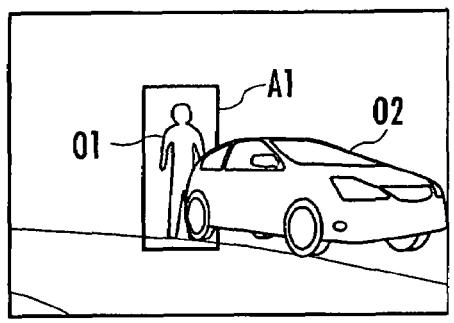
FIGS. 9(a), 9(b), 9(c), 9(d), and 9(e) are diagrams showing examples of a composite image area created by the image information processing method according to the second embodiment of the present invention.

More specifically, if it is determined that the first image area A1 shown in FIG. 5(a) and the second image area A2(n) shown in FIG. 6(a) are identical and the first image area A1 is stable, then the first box enclosing the first image area A1 is displayed on the HUD 220, as shown in FIG. 9(a).

Figure 5B:
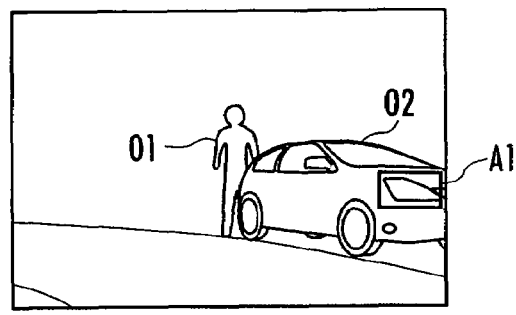
Figure 5C:
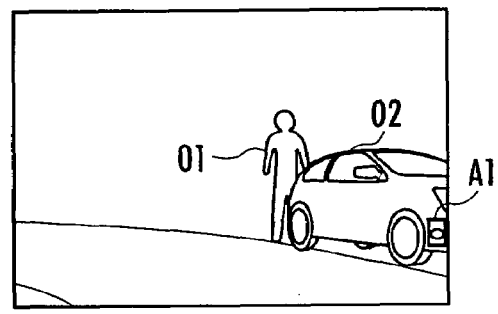
Figure 6B:
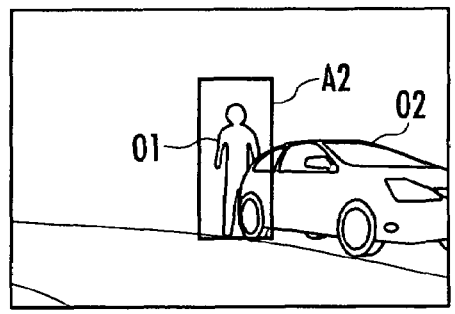
Figure 6C:
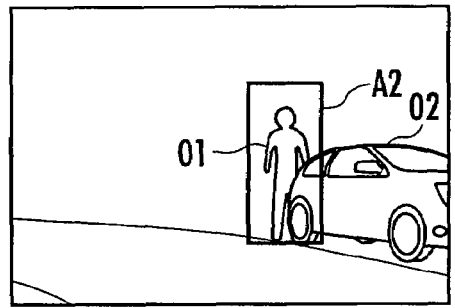
Figure 9B:
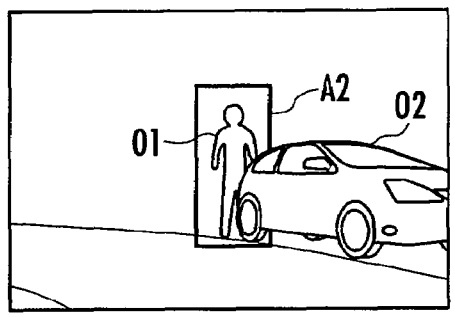
Figure 9C:
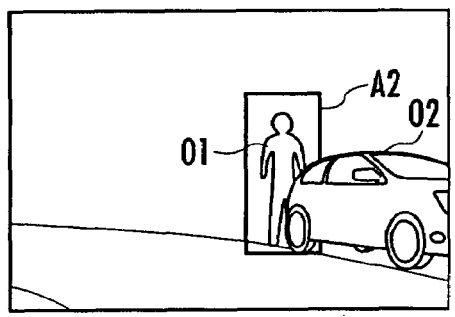

If it is determined that the first image area A1 shown in FIG. 5(b) and the second image area A2(n) shown in FIG. 6(b) are extremely different from each other and the first image area A1 is unstable, the instability being high, then the second box enclosing the second image area A2 is displayed on the HUD 220, as shown in FIG. 9(b). Similarly, if it is determined that the first image area A1 shown in FIG. 5(c) and the second image area A2 shown in FIG. 6(c) are not similar at all and the first image area A1 is unstable, the instability being high, then the second box enclosing the second image area A2 is displayed on the HUD 220, as shown in FIG. 9(c).

Figure 5D:
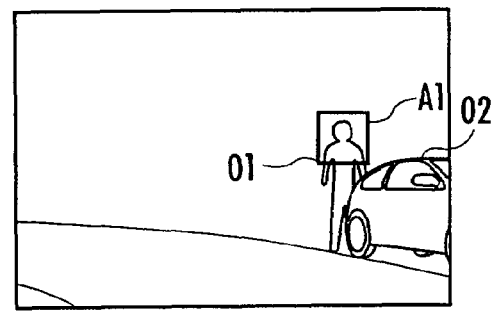
Figure 6D:
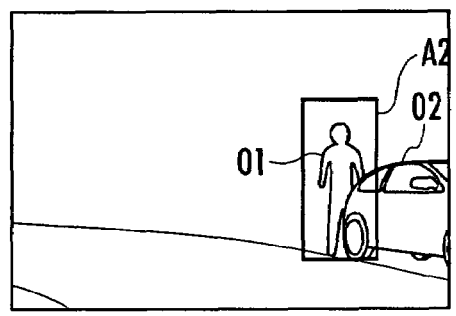
Figure 9D:
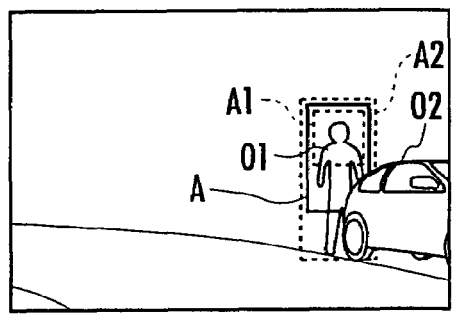

Further, if it is determined that the first image area A1 shown in FIG. 5(d) and the second image area A2(n) shown in FIG. 6(d) are different from each other and the first image area A1 is unstable, the instability being small, then a composite box enclosing a composite image area A is displayed on the HUD 220, as shown in FIG. 9(d).

Figure 5E:
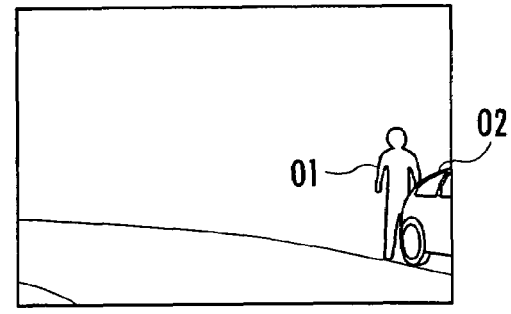
Figure 6E:
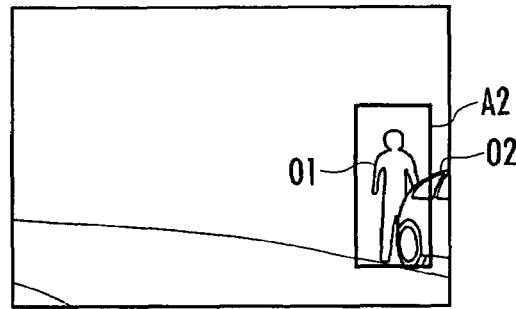
Figure 7A:
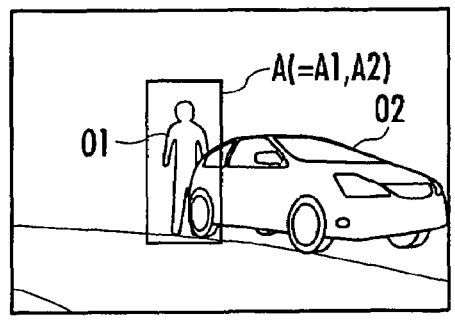
FIGS. 7(a), 7(b), 7(c), 7(d), and 7(e) are diagrams showing examples of a composite image area created by the image information processing method according to the first embodiment of the present invention.
Figure 7B:
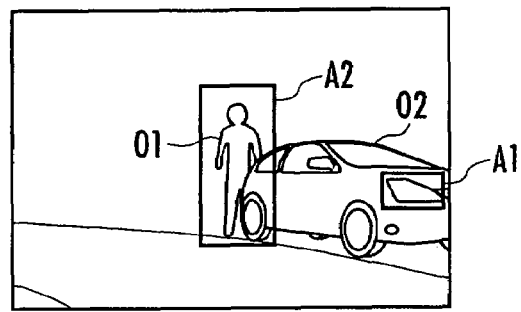
Figure 7C:
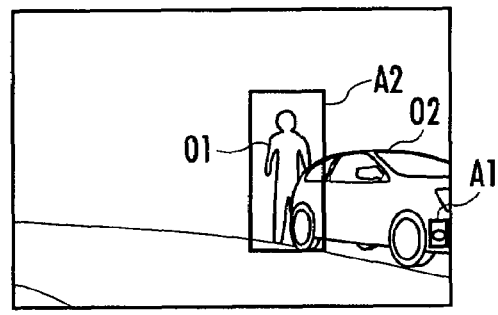
Figure 7D:
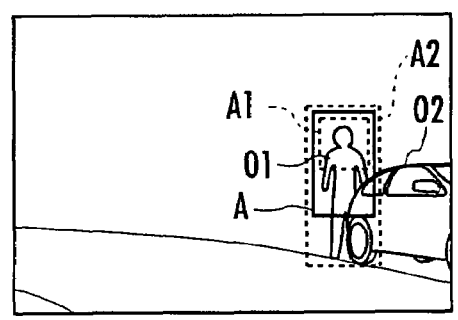
Figure 7E:
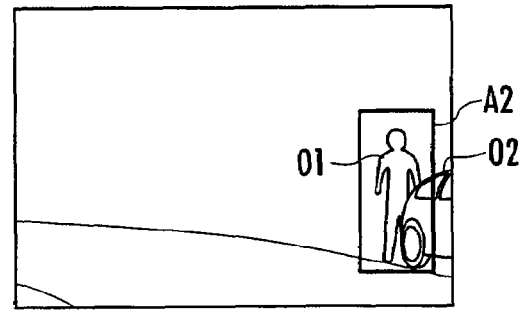
Figure 9E:
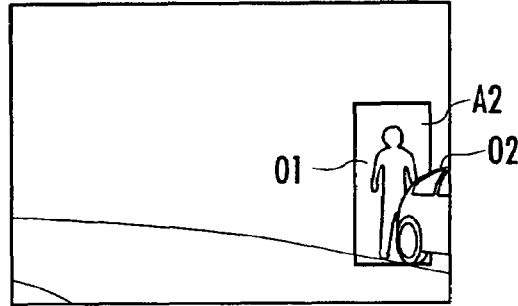

If the first image area A1 is not recognized as shown in FIG. 5(e), then the second image area A2 is recognized as shown in FIG. 6(e), and if it is determined that the first image area A1 is unstable, the instability being high, then the second box enclosing the second image area A2 is displayed on the HUD 220 as shown in FIG. 9(e).

Even if the first image area A1 associated with an object recognized through the infrared camera 210 is unstable (see FIG. 5(a) to FIG. 5(e)), the image information processing method in accordance with the second embodiment of the present invention carried out by the image information processing system 100 in accordance with the present invention makes it possible to stably display the box of an image area associated with the object on the HUD 220 (see FIG. 9(a) to FIG. 9(e)).

In the present embodiment, image information has been displayed on the HUD 220 mounted on the windshield of the automobile 200. As another embodiment, however, image information may be displayed on a display made integral with a meter or the display of a navigating device (not shown), which is mounted in the automobile 200.

In the embodiments described above, the position and rotation or turning, including the vehicle position $p1(i)$, in a three-dimensional space have been expressed by quaternion (see expressions (1) and (2)) in the processing of recognizing an image area that includes an object (see S121 and S122). As another embodiment, however, a position, such as the vehicle position $p1(i)$, in a three-dimensional space may be expressed by three-dimensional vectors and a rotation may be expressed by a three-dimensional matrix.

In the embodiments described above, the first, the second, and the composite boxes enclosing the first image area A1, the second image area A2, and the composite image area A, respectively, have been displayed on the HUD 220 as the first, the second, and the composite image information. As another embodiment, however, each image area may be displayed on the HUD 220 by means of a color, pattern, luminance, or the like to make it distinguishable from other image areas. A box enclosing an object itself having a certain level of brightness of a gray-scaled or binarized image included in each image area may be displayed on the HUD 220, or a part or all of the object whose brightness is a certain level or more included in each image area may be displayed on the HUD 220 such that it may be discriminated from other image areas by its color, pattern, brightness or the like. Thus, image information showing image areas may be displayed on the HUD 220 in any forms that make it possible to discriminate the image areas or objects, which are included therein and have brightness of a certain level or more, from other image areas.

In the second embodiment, the level of the instability of the first image area A1(n) has been determined (see S125 in FIG. 8). As another embodiment, however, the determination step may be omitted, and if the first image area A1(n) is unstable, then the second image information associated with the second image area A2(n) or composite image information associated with the composite image area A(n) may be always displayed on the HUD 220 by the image information control unit 140.

What is claimed is:

1. An image information processing system for processing an image of an object shot by an infrared camera mounted in a mobile body and then displaying image information regarding the object on an image display device mounted in the mobile body, comprising:

first variable measurement means for measuring a first variable based on a running mode of the mobile body;

second variable measurement means for measuring a second variable based on a position of the object through the infrared camera;
first image area recognition means for recognizing an image area associated with the object as a first image area on the basis of the second variable measured by the second variable measurement means;
second image area recognition means for estimating an image area recognized by the first image area recognition means on the basis of the first variable measured by the first variable measurement means and the second variable measured by the second variable measurement means and then recognizing the estimated image area as a second image area;
image information control means for displaying, on the image display device, one or both of first image information associated with the first image area recognized by the first image area recognition means and second image information associated with the second image area recognized by the second image area recognition means; and
composite image area recognition means that combines the first and the second image areas recognized by the first and the second image area recognition means, respectively, and then recognizes the result as a composite image area, wherein the image information control means causes the image display device to display one of the first and the second image information associated with the first and the second image areas, or the composite image information associated with the composite image area of the first and the second image areas recognized by the composite image area recognition means, wherein
if the image information control means determines that the first image area recognized by the first image area recognition means is stable, then it causes the first image information to be displayed on the image display device, whereas, if the image information control means determines that the first image area recognized by the first image area recognition means is unstable, then it causes the second image information or both the first image information and the second image information to be displayed on the image display device, and wherein
if the first image area recognized by the first image area recognition means is unstable, while an instability of the first image area is < a predetermined threshold, then the image information control means causes the composite information associated with the composite image area to be displayed on the image display device, and, if the first image area recognized by the first image area recognition means is unstable, while an instability of the first image area is > the predetermined threshold, then the image information control means causes the second image information associated with the second image area recognized by the second image area recognition means to be displayed on the image display device.

2. The image information processing system according to claim 1, wherein the image information control means causes the image display device to display composite image information associated with the composite image area of the first and the second image areas if the first and the second image areas have an overlapping portion.

3. The image information processing system according to claim 1, wherein the second image area recognition means estimates a value of the second variable, which will be measured by the second variable measurement means in the future, based on the first variable measured by the first variable measurement means and the second variable measured by the second variable measurement means, and then recognizes a second image area based on the estimated value of the second variable if the second variable measured by the second variable measurement means is determined to be unstable.

4. The image information processing system according to claim 3, wherein
the second variable measurement means performs measurement, taking a part or all of the second variable as a quaternion indicating the position of the object, and
the second image area recognition means estimates the second variable by using a quaternion expressing a spatial displacement based on the first variable measured by the first variable measurement means and the second variable measured by the second variable measurement means.

5. The image information processing system according to claim 4, wherein
the first variable measurement means measures the speed of the mobile body and the angular velocity about a certain axis as first variables, and
the second image area recognition means estimates the second variable by using a quaternion that expresses a turning motion specified by the speed and the angular velocity measured by the first variable measurement means.

6. The image information processing system according to claim 1, wherein, if the second variable measured by the second variable measurement means is unstable, then the second image area recognition means recognizes the second image area based on a prior value of the second variable measured by the second variable measurement means before such unstableness.

7. The image information processing system according to claim 6, wherein the second image area recognition means determines that the second variable is unstable if the measurement of the second variable by the second variable measurement means is disabled, or a variation amount of the second variable measured by the second variable measurement means exceeds a threshold value.

8. The image information processing system according to claim 1, wherein the image information control means determines that the first image area is unstable if a difference between or a mean value of one or a plurality of representative points of the first image area recognized by the first image area recognition means and one or a plurality of representative points of the second image area recognized by the second image area recognition means exceeds a threshold value.

9. An image information processing method for processing an image of an object shot by an infrared camera mounted in a mobile body and then displaying image information regarding the object on an image display device mounted in the mobile body, comprising:
use of a programmed computer to perform the following steps:
a first variable measurement step for measuring a first variable based on a running mode of the mobile body;
a second variable measurement step for measuring a second variable based on a position of the object through the infrared camera;
a first image area recognition step for recognizing an image area associated with the object as a first image area on the basis of the second variable measured in the second variable measurement step;
a second image area recognition step for estimating an image area recognized in the first image area recognition step on the basis of the first variable measured in the first variable measurement step and the second variable measured in the second variable measurement step and then recognizing the estimated image area as a second image area;

an image information control step for causing the image display device to display one or both of first image information associated with the first image area recognized in the first image area recognition step and second image information associated with the second image area recognized in the second image area recognition step; and a composite image area recognition step that combines the first and the second image areas, and then recognizes the result as a composite image area, wherein the image information control step causes the image display device to display one of the first and the second image information associated with the first and the second image areas, or the composite image information associated with the composite image area of the first and the second image areas, wherein first image information is displayed on the image display device if the first image area recognized by the first image area recognition step is determined to be stable, whereas, the second image information or both the first image information and the second image information are displayed on the image display device if the first image area recognized by the first image area recognition step is determined to be unstable, and wherein, if the first image area is unstable, while an instability of the first image area is < a predetermined threshold, then the image information control step causes the composite information associated with the composite image area to be displayed on the image display device, and, if the first image area is unstable, while an instability of the first image area is > the predetermined threshold, then the image information control step causes the second image information associated with the second image area to be displayed on the image display device.

10. An image information processing system for processing an image of an object shot by an infrared camera mounted in a mobile body and then displaying image information regarding the object on an image display device mounted in the mobile body, comprising:

first variable measurement means for measuring a first variable based on a running mode of the mobile body;

second variable measurement means for measuring a second variable based on a position of the object through the infrared camera;

first image area recognition means for recognizing an image area associated with the object as a first image area based on the second variable measured by the second variable measurement means;

second image area recognition means for estimating an image area recognized by the first image area recognition means based on the first variable measured by the first variable measurement means and the second variable measured by the second variable measurement means and then recognizing the estimated image area as a second image area;

image information control means for displaying, on the image display device, one or both of first image information associated with the first image area recognized by the first image area recognition means and second image information associated with the second image area recognized by the second image area recognition means; and a composite image area recognition means that combines the first and the second image areas recognized by the first and the second image area recognition means, respectively, and then recognizes the result as a composite image area, wherein the image information control means determines stability of one or more of the first and the second image areas and causes the image display device to display one of the first image information and the second image information associated with the first and the second image areas, or the composite image information associated with the composite image area of the first and the second image areas recognized by the composite image area recognition means based on the determined stability of one or more of the first and the second image areas; and wherein, if the first image area recognized by the first image area recognition means is unstable, while an instability of the first image area is < a predetermined threshold, then the image information control means causes the composite information associated with the composite image area to be displayed on the image display device, and, if the first image area recognized by the first image area recognition means is unstable, while an instability of the first image area is > the predetermined threshold, then the image information control means causes the second image information associated with the second image area recognized by the second image area recognition means to be displayed on the image display device.

11. The image information processing system according to claim 10, wherein the image information control means causes the image display device to display composite image information associated with the composite image area of the first and the second image areas if the first and the second image areas have an overlapping portion.

12. The image information processing system according to claim 10, wherein the second image area recognition means estimates the second variable, which will be measured by the second variable measurement means in the future, based on the first variable measured by the first variable measurement means and the second variable measured by the second variable measurement means, and then recognizes a second image area based on the estimated second variable if the second variable measured by the second variable measurement means is determined to be unstable.

13. The image information processing system according to claim 12, wherein the second variable measurement means performs measurement, taking a part or all of the second variable as a quaternion indicating the position of the object, and the second image area recognition means estimates the second variable by using a quaternion expressing a spatial displacement based on the first variable measured by the first variable measurement means and the second variable measured by the second variable measurement means.

14. The image information processing system according to claim 13, wherein the first variable measurement means measures speed of the mobile body and an angular velocity about a certain axis as first variables, and the second image area recognition means estimates the second variable by using a quaternion that expresses a turning motion specified by the speed and the angular velocity measured by the first variable measurement means.

15. The image information processing system according to claim 10, wherein, if the second variable measured by the second variable measurement means is unstable, then the second image area recognition means recognizes the second image area based on the second variable measured by the second variable measurement means before the instability.

16. The image information processing system according to claim 15, wherein the second image area recognition means determines that the second variable is unstable if the measurement of the second variable by the second variable measurement means is disabled, or a variation amount of the second variable measured by the second variable measurement means exceeds a threshold value.

* * * * *